(12) United States Patent
Ohl et al.

(10) Patent No.: US 7,673,494 B2
(45) Date of Patent: Mar. 9, 2010

(54) DEVICE FOR TESTING AT LEAST ONE PRESSURE SENSOR

(75) Inventors: Christian Ohl, Pfullingen (DE); Oliver Schatz, Reutlingen (DE); Boris Adam, Gaeufelden (DE)

(73) Assignee: Robert Bosch GmbH, Stuttgart (DE)

( * ) Notice: Subject to any disclaimer, the term of this patent is extended or adjusted under 35 U.S.C. 154(b) by 709 days.

(21) Appl. No.: 10/996,153

(22) Filed: Nov. 23, 2004

(65) Prior Publication Data

US 2005/0120773 A1    Jun. 9, 2005

(30) Foreign Application Priority Data

Dec. 9, 2003    (DE)    ................. 103 57 353

(51) Int. Cl.
*G01L 27/00*    (2006.01)
(52) U.S. Cl. ....................................... 73/1.57
(58) Field of Classification Search ......... 73/1.57–1.69, 73/40
See application file for complete search history.

(56) References Cited

U.S. PATENT DOCUMENTS

| | | | |
|---|---|---|---|
| 3,273,376 A | | 9/1966 | Aronson et al. |
| 4,393,878 A | * | 7/1983 | Kahn .......................... 600/561 |
| 4,590,791 A | * | 5/1986 | Reed et al. .................... 73/1.61 |
| 4,617,826 A | * | 10/1986 | Hagen .......................... 73/182 |
| 4,698,997 A | | 10/1987 | Hess et al. |
| 5,808,176 A | * | 9/1998 | Chang .......................... 73/1.58 |
| 5,900,530 A | | 5/1999 | O'Brien et al. |
| 6,176,137 B1 | * | 1/2001 | Sasaki et al. ................... 73/754 |
| 6,662,634 B2 | * | 12/2003 | Lehmann ..................... 73/49.2 |
| 2002/0092356 A1 | * | 7/2002 | Yamamoto et al. ............. 73/754 |
| 2002/0152794 A1 | | 10/2002 | Dietrich et al. |
| 2006/0283256 A1 | * | 12/2006 | Kumpfmuller ............... 73/706 |

FOREIGN PATENT DOCUMENTS

| DE | 3447397 | * | 7/1986 |
|---|---|---|---|
| DE | 100 00 133 | | 7/2001 |

* cited by examiner

*Primary Examiner*—Robert R Raevis
(74) *Attorney, Agent, or Firm*—Kenyon & Kenyon LLP

(57) ABSTRACT

A device for testing at least one pressure sensor, by applying a pressure signal, the device testing the operativeness of the pressure sensor as a function of the pressure signal. In addition, it is provided that the device tests the tightness of the pressure sensor as a function of the pressure signal.

4 Claims, 2 Drawing Sheets

DEVICE FOR TESTING AT LEAST ONE PRESSURE SENSOR

BACKGROUND INFORMATION

A device for checking pressure sensors is known from German Patent Application No. DE 100 00 133. In this context, the pressure sensors are checked with respect to their function. The device exerts either a static or a dynamic pressure on the pressure sensor and measures its reaction with the aid of its electrical signal. The operativeness of the pressure sensor is verified with the aid of this reaction. The checking is done after final assembly.

SUMMARY OF THE INVENTION

The device according to the present invention for testing at least one pressure sensor has the advantage that now, in addition, as a function of the pressure signal that the device exerts on the pressure sensor, the tightness (leakproofness) of the at least one pressure sensor is checked. A pressure sensor, particularly for side impact sensing, is usually constructed in such a way that it has a pressure inlet channel in the housing, which supplies the environmental pressure to a diaphragm that is mounted, for instance, in a premold housing. In order to be protected from water vapor, and especially salt water vapor, the diaphragm is fully sealed using a gel seal. In order not to let the water vapor penetrate into the pressure housing beyond the pressure inlet channel and the gel seal, the pressure inlet channel is typically sealed at the housing around the diaphragm. The sealing may be implemented, for example, by pressing in a silicone pad (washer) between the inlet channel and the sensor housing. Whether this seal has a certain tightness is an important functional parameter. In an advantageous manner, using the checking procedure, one may test in one step both the operativeness of the pressure sensor with respect to its pressure measuring and its tightness.

It is particularly advantageous that the device checks the tightness as a function of the variation with time of a response signal of the pressure sensor to a static pressure signal with respect to tightness. Because, in the case of the static pressure signal, a reduction in pressure shows that there is a leak in the pressure sensor, so that the pressure declines in the direction of the housing. For this test, the pressure sensor is preferably accommodated in a test box, that is, in a box that accommodates the pressure sensor so that one may submit it to a test with respect to its tightness. For, the housing of a pressure sensor also has welded seams, which could possibly lead to a lack of tightness.

However, it is alternatively also possible to check the tightness using a dynamic signal. For, the dynamic signal shows, in the response signal of the pressure sensor, a lesser amplitude if there is a leak in the pressure sensor. This measurement is suitable especially for greater leaks, whereas the measurement using static pressure is suitable for fine leaks. It follows from this that a combination of these two measurements is very advantageous.

The device may preferably also have an accommodation which has a seal, for example a silicone seal, in order to produce a connection of the device to a pressure sensor only about a pressure inlet channel of the pressure sensor. This accommodation then has a greater radius than the pressure inlet channel, in order to enclose it. Using this measurement, one then primarily measures the tightness through the seal. Other leaks in the housing of the pressure sensor are not able to be detected like that.

Furthermore, it is of advantage that the device has a reference sensor. This reference sensor experiences the same pressure signals from the device, and is thus used for an assessment as to whether the pressure sensor to be measured measures the pressure within specified parameters.

Accordingly, the reference sensor should have the same signal applied to it as the pressure sensor that is to be checked.

Preferably, the pressure signal is generated using a pressure reservoir in which an overpressure is present and a valve applied upstream of it. The valve can then be opened rapidly and closed again, in order, for example, to generate a short pressure pulse. Such a pressure pulse is preferably suitable for sensing a difference pressure sensor or a pressure sensor which, in its application, has to detect rapid pressure changes.

DETAILED DESCRIPTION

Pressure sensors are increasingly being used for impact sensing. In this context, the pressure sensors are frequently installed in lateral cavities of a vehicle, so that if there is an impact upon the wall of the cavity, based on the rapid deformation and thus volume reduction, one may measure a brief adiabatic pressure increase, in order thereby to have a rapid sensing method for a side impact. These pressure sensors may be produced micromechanically. Usually this involves micromechanics based on silicon. In this context, using micromechanical technology, a diaphragm is produced, about which an evaluation circuit is provided. The evaluation circuit having a measuring amplifier generates the measuring signal which then, using a transmitter module, is transmitted to a control unit, which also activates means of restraint, as a function of this signal. The diaphragm of the pressure sensor, as represented above, is exposed to the medium in the lateral cavity. In order to protect the diaphragm from humidity and other corrosive effects in the lateral part, the diaphragm is fully sealed using a gel seal. The gel sealing and possibly additional sealing measures lead to a sealing of the inner chamber of the pressure sensor. And with that, the other components, the evaluation circuit, the analog/digital converter, the measuring amplifier are protected from these corrosive effects. As a result, it is necessary to check the tightness of this pressure sensor.

According to the present invention, the measuring of the tightness is combined with a measurement of the operativeness of the pressure sensor. The pressure signal, generated by the device for testing of the pressure sensor, leads to a response signal of the pressure sensor to be checked. In this context, a reference pressure sensor may now additionally be used for comparing the response signal of the pressure sensor to be checked to that of the reference pressure sensor. In addition, the analysis of the variation with time of a response signal to a static pressure signal is able to give information on the tightness of the pressure sensor. If the response signal becomes lower in the course of time, this points clearly to a leak. Using this method, particularly fine leaks may be identified. If a pressure pulse is generated, if one wishes to test the pressure sensor, one may possibly conclude that there is a leak in light of the amplitude of the response signal to this pressure pulse. However, this method is only meaningful in the case of larger leaks. In an advantageous manner, the measurement may be made in a test box that is relatively small, in order, in this test box, to apply the test pressure to the pressure sensor and to minimize the dead volume. The reference pressure sensor may also be located in the test box.

Figure 1:
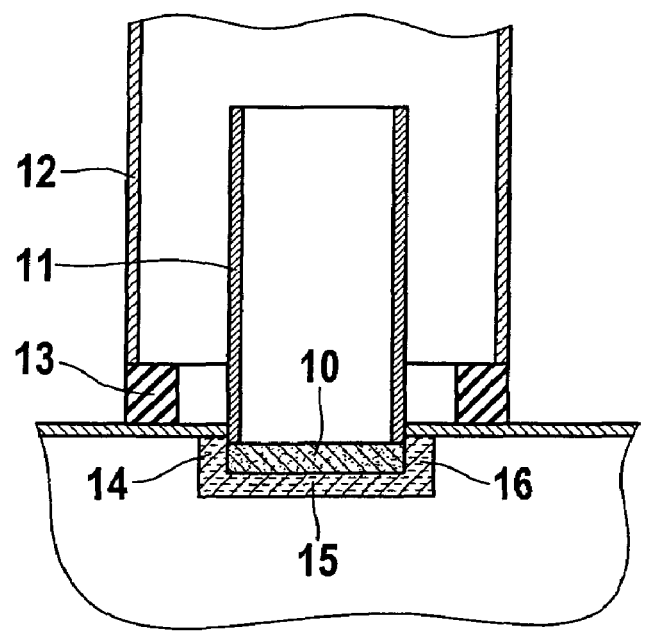
FIG. 1 shows a first device for measuring a pressure sensor.

However, FIG. 1 shows a cutout of device 12, which is inverted around pressure inlet channel 11 of the pressure sensor. For this, device 12 has a seal 13, which thereby forms a closed-off volume within device 12, so that the test may be carried out therein. In the case of seal 13, an elastic seal is involved, such as a rubber seal or a silicone ring. At the end of pressure inlet channel 11 there is a full gel seal 15, 14 and 16 which protects the measuring diaphragm 10. The full gel seal 14 to 16 is such that it protects the inner space of the pressure sensor from the surrounding air. For simplicity's sake, the inner components of the pressure sensor are not shown. However, this device makes possible only the tightness measurement of the full gel seal 14 to 16. A measurement of another leak, for instance in the housing of the pressure sensor, cannot be made using this device.

Figure 2:
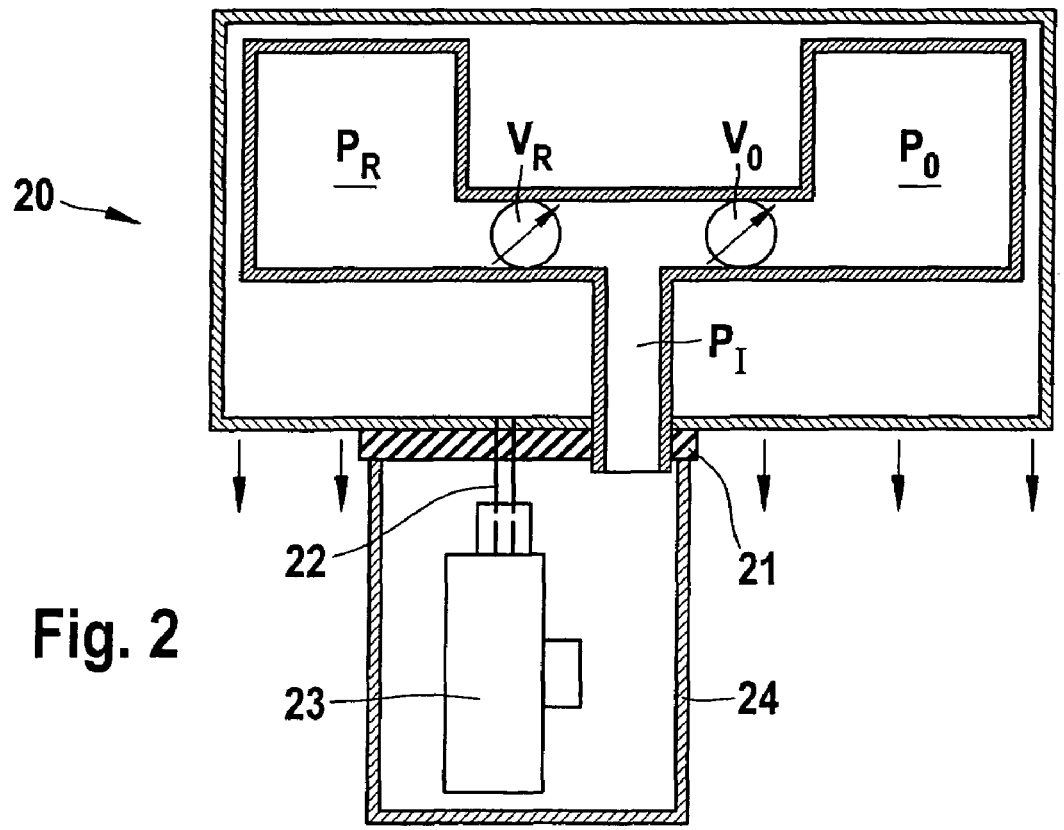
FIG. 2 shows a second device for checking a pressure sensor.

FIG. 2 shows a variant of the device according to the present invention, using which such leaks may also be detected. Device 20 has a test box 24 in which pressure sensor 23, that is to be tested, is located, which is connected to device 20 via a contacting 22. The measured pressure signals of the pressure sensor are transmitted to device 20 via contacting 22. The contacting is such that it is the same as the real connection of the separated pressure sensor to a control unit, which is usually at the highway tunnel. Although not shown here, device 20 has an evaluation of these pressure signals, in order to verify the operativeness of pressure sensor 23 and to test whether there is a leak. Alternatively, it is possible to provide a reference pressure sensor in test box 24, in order to compare the pressure signals of the pressure sensor with the response signals of the reference pressure sensor. The pressure in test box 24 $P_I$ is set via two valves $V_O$ and $V_R$. However, in order that test box 24 not carry out a pressure equalization with the environment, a seal 21 is provided.

Valves $V_O$ and $V_R$ each control pressure reservoirs in which pressures $P_O$ and $P_R$ are set for example by compressors. Valves $V_O$ and $V_R$ are rapidly switchable, so that, using them, short pressure pulses having flank slopes up to 300 mba/ms may be generated, in order to test pressure sensor 23 also as a dynamic difference pressure sensor. In particular, because of the system, the preparation of a pressure slope is possible, since the pressure $P_R$ is substantially less than the pressure $P_O$. Thus, if pressure valve $V_O$ is opened, and pressure valve $V_R$ is opened as well, as the pressure PI, the pressure $P_I$=the pressure $P_R$+$P_O$ arises. But even if only pressure valve $V_R$ is opened, pressure $P_R$ comes about, which is less than pressure $P_O$, in this instance, pressure valve $V_O$ remaining closed. If pressure valve $V_R$ is closed, and pressure valve $V_O$ is opened, then pressure $P_I$ is equal to $P_O$. The arrows signal that, for sealing, the device has to be pressed onto the sensor base, using a certain force.

Figure 3:
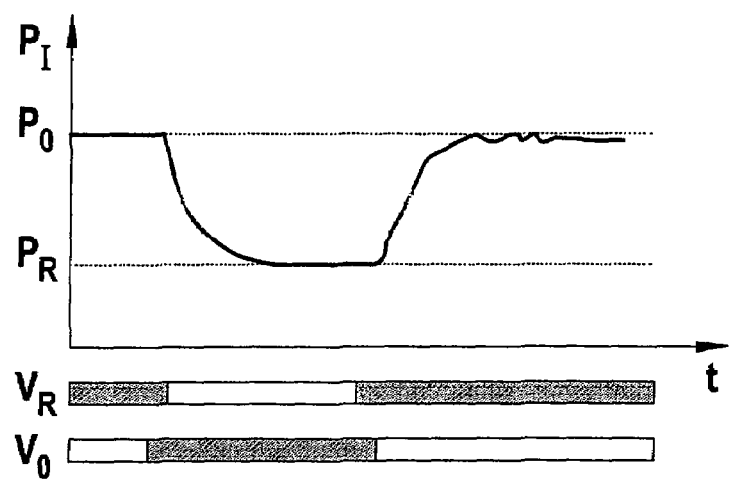
FIG. 3 shows a measuring signal.

FIG. 3 shows a pressure pulse measured by pressure sensor 23, as a function of a switching sequence of valves $V_R$ and $V_O$. The blackened bars at the bottom, below the diagram, mean that the respective valve $V_R$ or $V_O$ is closed. The respective white section or the respective white sections for valve $V_O$ mean that the respective valve is open. As may be seen in the two bars, there are short periods of time in which both valves are closed. In the pressure/time diagram, two parallel lines characterize lower pressure $P_R$ and higher pressure $P_O$. When valve $V_O$ is closed and subsequently valve $V_R$ is opened, pressure $P_R$ sets in, at a certain slope, as response signal $P_I$ of pressure sensor 23. At the subsequent closing of valve $V_R$ and opening of valve $V_O$, the higher pressure $P_O$ is then measured again. The dynamics of the increasing and decreasing slopes give information on the functioning and the tightness of pressure sensor 23.

Figure 4:
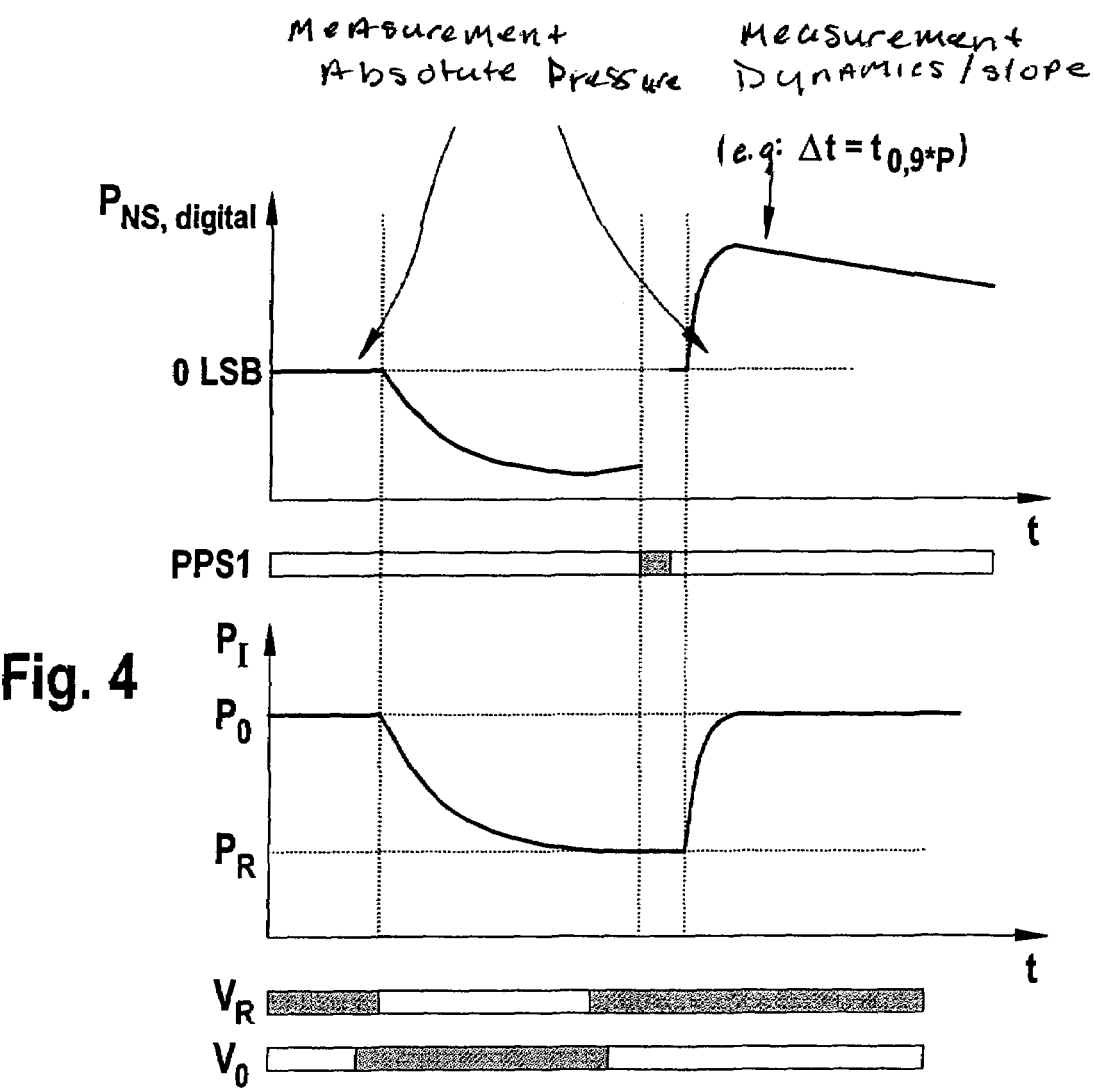
FIG. 4 shows a measuring signal and the response of the pressure sensor.

FIG. 4 explains this using two pressure/time diagrams. The lower part of the diagram shows the typical curve of the inside pressure in the test chamber measured using the reference sensor. After switching in/switching off the two pressure reservoirs via valves $V_R$ and $V_O$, in the example, the pressure in the test chamber decreases at first, and rises again to the original value after switching in $P_O$. The upper part of the diagram shows the typical response function of the item to be tested using a pressure difference function (internal v. external). Because the offset is regulated internally, the output signal, after reaching the maximum amplitude, tends to zero LSB with the control rate. The measuring of the dynamics of the sensor is carried out at the ramp (i.e., the ramped or sloped portion of the curve following PPS1). In addition, the accuracy of the measured absolute pressure may be controlled (e.g., verified) at points in time at which the pressure external to the chamber is constant and specified.

The control of leakage may be carried out via the signal of the reference sensor if, shortly after setting the constant pressure, both valves are closed. In this state, the leakage rate may be ascertained from the changes in the reference signal. Coarse leaks may be detected by comparing amplitudes of the reference sensor and the item to be tested.

What is claimed is:

1. A device for testing at least one pressure sensor that senses a side impact, the pressure sensor including a sealed diaphragm and a pressure inlet channel, the device comprising:

an arrangement for applying a pressure signal, and for testing a pressure measured by the at least one sensor and a tightness of the diaphragm as a function of the pressure signal, the arrangement including a closed off volume to supply environmental pressure to the pressure inlet channel and the diaphragm, the measured pressure and tightness being tested simultaneously.

2. The device according to claim 1, wherein the tightness is tested as a function of a variation with time of a response signal of the pressure sensor to a static pressure signal.

3. The device according to claim 1, wherein the tightness is tested as a function of an amplitude of a response signal as a function of a pressure difference.

4. The device according to claim 1, wherein the arrangement includes an accommodation having a seal, which encloses the pressure inlet channel.

* * * * *